United States Patent [19]

King

[11] 3,745,543

[45] July 10, 1973

[54] SUSPENSION AND MOUNTING OF TRANSDUCER HEADS USING RESILIENT SPACERS TO POSITION HEAD

[75] Inventor: Wayne Jay King, Leucadia, Calif.

[73] Assignee: Pacific Micronetics, Inc., San Diego, Calif.

[22] Filed: June 15, 1970

[21] Appl. No.: 46,250

[52] U.S. Cl. .................... 340/174.1 E, 179/100.2 P

[51] Int. Cl. ........................ G11b 5/60, G11b 21/20

[58] Field of Search ............... 340/174.1 E, 174.1 F; 179/100.2 P

[56] References Cited

UNITED STATES PATENTS

| | | | |
|---|---|---|---|
| 2,937,240 | 5/1960 | Harker | 340/174.1 E |
| 3,243,790 | 3/1966 | Powers | 179/100.2 P |
| 2,886,651 | 5/1959 | Vogel | 340/174.1 E |
| 3,123,677 | 3/1964 | Lauxen et al. | 340/174.1 E |
| 3,453,611 | 7/1969 | Laermer | 340/174.1 F |
| 3,268,877 | 8/1966 | Hagen | 179/100.2 P |

*Primary Examiner*—James W. Moffitt
*Assistant Examiner*—Alfred H. Eddleman
*Attorney*—Smyth, Roston & Pavitt

[57] ABSTRACT

A "flying" transducer head is mounted in relation to a hard surface (disc or drum) through a retractable gimbal with pitch and roll positions of the head established through resilient spacers free from stress and strain when the head rests on the surface.

7 Claims, 3 Drawing Figures

PATENTED JUL 10 1973 3.745.543

SUSPENSION AND MOUNTING OF TRANSDUCER HEADS USING RESILIENT SPACERS TO POSITION HEAD

The present invention relates to improvements for suspension and mounting of transducer heads, particularly of multiple magnetic transducers mounted in a common head for cooperation with a hard storage carrier surface such as a magnetic drum or disc.

Disc files or drum memories cooperate with magnetic transducers in that the transducer head is provided with aerodynamic characteristics and rides on a boundary layer which is developed above the storage carrier surface during rotation thereof. Thus, the head flies above that surface, but at a rather close distance therefrom, such as below a hundred micro inches. That distance is actually smaller than tolerances between, for example, any particular disc and the mounting and suspension system for the transducer head. Therefor, it is a rather difficult problem to obtain the desired flying position of the head; particularly, it is difficult to mount the head in relation, for example, to a particular disc rather than in relation to a datum plane assumed to represent the disc surface. In addition, it has to be observed that the surface of the head, facing the hard carrier surface, must have a certain angle of attack so that in fact aerodynamic lift is provided. Moreover, the head must lift uniformly above the hard surface as to its roll position.

In essence, two types of head mounting systems are known. In one system the head with carrier is retracted from the surface of the storage carrier when halting; the head with carrier is lowered and pushed toward the surface after it is set into motion. The particular position of the head when protracted is referenced to and preadjusted in accordance with an assumed disc surface. In the second system the head carrier rests on the disc when at rest, but as soon as the disc moves, long before rotating at rated speed, aerodynamic force begins to lift the head from the surface. Neither system as it has been practiced, however, takes into account that there are variations in the relative positions of head, head carrier and disc, requiring, therefor, difficult and expensive adjusting procedures to establish the desired attitude of the head as far as pitch and roll relative to axes running parallel to the discs.

It is an object of the present invention to predetermine and to fix attitude and position of a transducer head in a retractable head system and in relation to the surface of a hard surface type storage carrier when moving. The problem essentially is to mount a transducer head in a particular operating position from which it can be retracted, but which can be restored without calibrating procedure, in a self-aligning operation. In accordance with the preferred embodiment of the invention, it is suggested to mount the transducer head in a gimbal suspension system which serves as head carrier. This carrier can be retracted from and protracted toward a hard surface storage carrier. The gimbal system is, in turn, mounted to stationary support structure but permitting displacement normal to the surface of the storage carrier.

Initially, the gimbal-head system is caused to protract so as to rest on the surface of the storage carrier assumed to be at rest. The protracted position is maintained by a balance of forces, including resilient reaction tending to lift the head off the surface, but without reaction into the surface. In that position of the head carrier, pitch and roll angle positions of the head therein, particularly in the gimbal system, are likewise determined merely by operation of the resting position of the head on the storage carrier surface; means are provided (*a*) to retain this position in a force-free relationship as far as angular deflection about pitch and roll axes for the head in the gimbal system is concerned, (*b*) to set up position restoring forces should the head be angularly deflected out of that position when not resting on the disc's surface. This angular position relationship is established relative to the actual carrier surface as well as to stationary mounting and suspension structure for the gimbal, even though there are unknown tolerances in the relation between these two components of the system, i.e., even though the actual position relation between gimbal mount and disc needs to be known only as to average conditions for discs of that particular type.

As long as the head rests on the carrier surface, angular deflecting forces do not act on the head. However, after retraction of the head and upon subsequent protraction by the same amount, while the carrier moves, the previous head position will be restored, and the head assumes or tends to assume precisely the same position should deflecting disturbances occur. If the storage carrier is in motion during subsequent head protraction, the tendency of the head to assume its adjusted, force-free position is conteracted by aerodynamic lift so that the head will be lifted off the surface in proper attitude to ride on the boundary layer set up by the moving carrier.

Pitch and roll positions of the head are preferably established by resilient spacers, which initially were drops of a thixotropic liquid applied between spaced-apart elements on the gimbal, the head and/or the gimbal mount, to provide interaction force-free interconnection between these parts. The liquid is particularly applied while the head rests on the storage carrier. After curing of the liquid, solid spacers are in fact established which are free from internal stress and tension. However, any deflection about pitch and roll axis sets up resilient reaction in the spacers restoring attitude and roll position of the head.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figures 1, 2, 3:
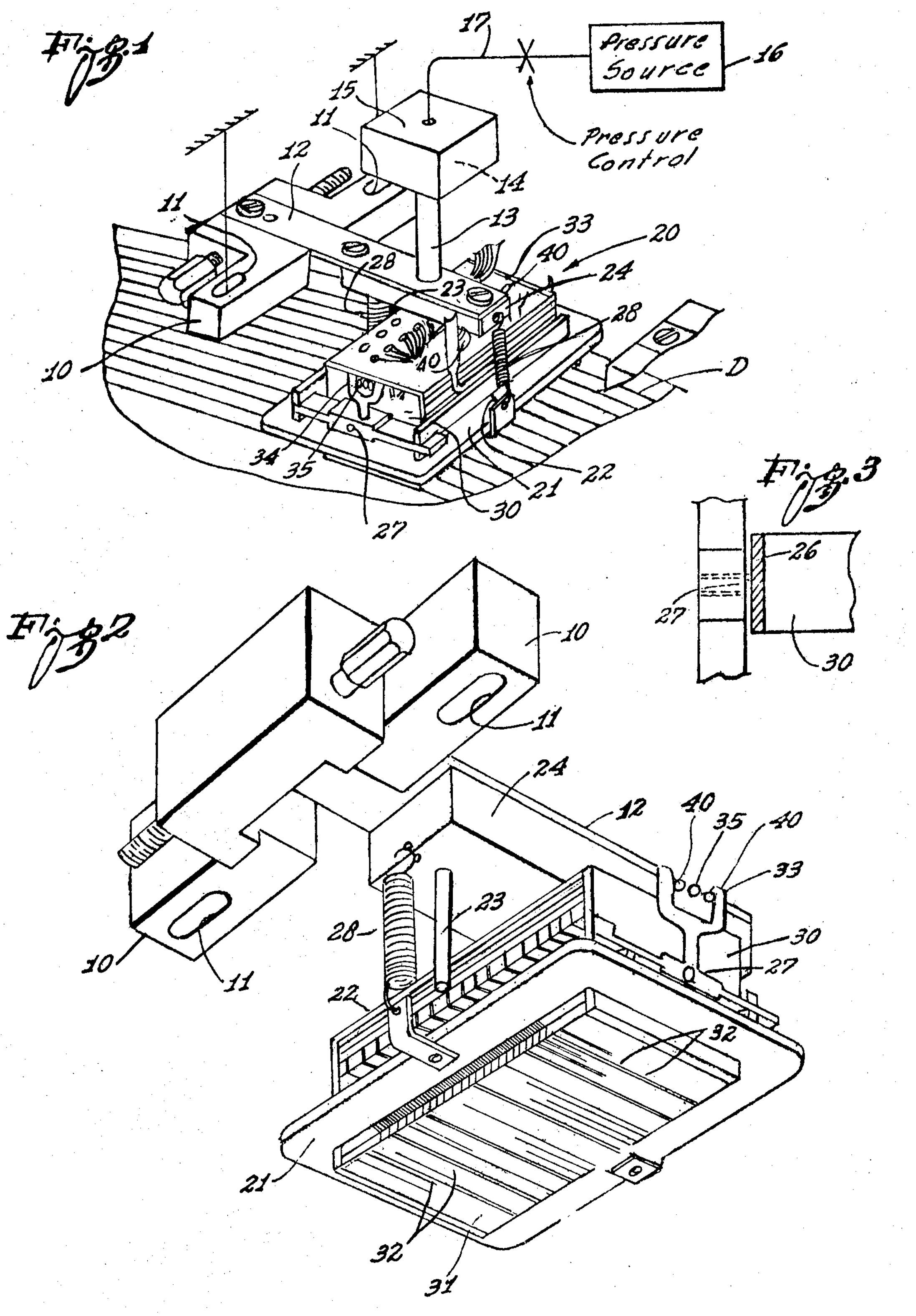
FIG. 1 illustrates a perspective view of the preferred embodiment of the invention, somewhat from above.
FIG. 2 illustrates part of the same structure, somewhat from below.
FIG. 3 illustrates the pin and bearing of the gimble system.

Turning now to the detailed description of the drawings, there is illustrated a transducer head mounting system improved in accordance with the present invention. Particularly, a transducer head 30 is to be positioned for cooperation with a rotating memory disc D. The head 30 includes a plurality of individual transducers 32 provided for magnetic cooperation and interaction with a magnetizable surface layer of the disc D. The individual transducers in the head cooperate particularly with individual,concentric information tracks on the disc. Head 30 has a lower surface 31 which is also the lower operating surface of each transducer therein. During rotation of the disc that surface 31 must not engage the disc. Therefor, the structure to be described in the following is designed to obtain a particular head position above the disc. Some of the details of that position have been alluded to above and will be developed fully in later parts of this description.

Reference numeral 10 denotes the principal head carrier base. During installation base 10 will be secured to stationary mounting structure (not shown) which is common to all of the various heads that may cooperate with disc D. This mounting structure pertains to the overall frame, housing and mounting system of this particular disc system. Base 10 is provided with oblong bore holes 11, for receiving positioning pins by means of which the base 10 can be indexed in accordance with particular relationship among the various heads.

The mounting structure to which the base 10 is mounted, as well as base 10 itself when affixed thereto, has a particular position relation to the surface of the disc as mounted for rotation, but the position relation has validity only in the average case. As was outlined above, there are rather minute but not insignificant deviations of this position relation from the theoretical values, due to differences in the dimensions of individual discs. The tolerances in the disc, therefore, establish deviations in the actual head positions from the theoretical ones based on average disc dimensions. The mounting structure for the head 30 and its head carrier 20 offsets this deviation.

Base 10 carries one end of a rather stiff leaf spring 12, which is bolted to the base and establishes in essence a resilient cantilever from which a head carrier 20 with head proper therein is suspended. In the unbiased position spring 12 is relaxed and in the non-deflected state, except for possible deflection resulting from gravity acting on the suspended head. In this position the head is retracted from the disc's surface at a relatively far distance, amply sufficient to meet all occurring tolerances,so as to establish positively head retraction.

In order to cause the head to move toward the disc surface and to reside in close proximity thereto, or even in contact therewith, there is provided a piston 13 coupled to a diaphragm 14 constituting a flexible wall of a particular chamber 15. A pressure line 17 extends from an air pressure supply and control system 16 to chamber 15. This system 16 and 17 is shown only schematically and it is understood that in case atmospheric pressure is applied to chamber 15, pressure force is not exerted upon diaphragm 14, so that spring 12 remains in the relaxed position, retracting the head from the disc surface accordingly. As pressure of particular value is supplied by system 16 to line 17 and to chamber 15, plunger or piston 13 is urged in down direction deflecting the spring 12 and placing carrier 20 with head 30 closer to the disc's surface.

The head carrier 20 is constituted by a gimbal system for particularly suspending head 30. There is a first gimbal carrier 21 constructed as a quadrilateral frame extending normally essentially or at least approximately parallel to the disc D. Bearing cones 22 are provided to define a first pivot axis of the gimbal system, the axis, of course, is in the plane of predominant extension of the frame. A pair of pins 23 extends from a carrier bar 24, which, in turn, is affixed to spring 12. The pins 22 have rounded tips in the lower ends, where resting in bearing cones 22, to provide journalling on the first gimbal axis. Coil springs 28 suspend the frame 21 from bar 24 and urge the pins into engagement with the bearing cones. Frame 21, thus, pivot about the first axis which is in essence normal to the predominant direction of deflection of cantilever spring 12.

Frame 21 is, in addition, provided with pins 27 received by bearing elements 26 in opposite short sides of head 30. Pins 27 and bearings 26 are aligned to form a second pivotal axis of the gimbal system, transverse to the first axis but also normal to the direction of deflection of spring 12. The two pivot axes are positioned to intersect the center of gravity of head 30 as closely as possible. Thus, head 30 is suspended from cantilever spring 12 in a manner which permits its pivoting about two axes. Moreover, the head as suspended will be at equilibrium in any pitch and roll orientation therein. Thus, without additional restraining features, the lower surface 31 of head 30 can assume and retain any desired orientation at equilibrium. On the other hand, the position of the head normal to the surface of the disc is determined by the controlled position of the plunger.

On basis of the equipment, as described thus far, the particular operating conditions shall now be specified. It is essential that lower surface 31 of the head be adjusted and positioned in relation to the disc, so that by aerodynamic interaction, lift is provided upon the head for maintaining the head transducer gaps within a specified distance above the fast rotating disc without possibility of contact. For this, it is essential that the aerodynamic lifting force, produced by the moving boundary layer above the disc's surface, is balanced by a force that maintains the head above the actual surface of the disc and at a particular distance therefrom. This head maintaining force is essentially a reaction force by the head suspension system when aerodynamic lift acts on the head. This means that the combined action of spring reaction, when deflected by pressurized plunger 13, must be caused to position the head in a first equilibrium position relative to the disc's surface when there is no dynamic lift, and in a second equilibrium position when there is lift. These equilibrium positions must be established relative to the actual disc and not just relative to a fixed datum plane of and as established by the mounting structure general.

When we speak of distance of the head from the disc, we must consider that this has meaning only (*a*) as to the center of gravity of the head or (*b*) as to the lower surface 31 when coplanar to the disc or (*c*) as to any particular point or edge of that surface when particularly tilted.

Head 30 is suspended by and in the gimbal system, so that that surface 31 can tilt. Particularly here, the pivot axis defined by pins 27 can also be regarded as the pitch axis of the "flying" head. Flying attitude is critical as a different angle of attack will change the aerodynamic conditions which, in turn, changes the distance of the transducers from the disc's surface. In flying attitude the leading edge of surface 31 is somewhat higher above the moving disc and boundary layer than the trailing edge. The transducers, and here particularly the gaps thereof, are, of course, near the trailing edge of the flying lower surface of the head as illustrated.

The angle of attack and the distance of the transducers from the disc's surface are, therefor, operating parameters in that for the operating speed of the disc the moving boundary layer provides sufficient lift to maintain that head position. The head 30 must, thus, be positioned in the gimbal to establish the particular pitch required for flying above the surface of the particular disc at the required distance.

Another point to be considered is the following. The gimbal frame may pivot about the axis as defined by bearings 22, which can be regarded as "roll" axis of the head. The two outermost transducers in the head, one scanning a track more toward the center, the other scanning a peripheral track, should have the same distance from the disc. Due to variation in thickness of the disc and due to absence of precise planar configuration of the disc's surface, this condition is not automatically met, particularly not by fixing the roll position of the head to an assumed datum.

The transducer head 30 must,thus, be positioned in particular relation to the actual surface of the disc as datum plane out of which position the flying attitude is established by aerodynamic intraction, shifting the head from one position of equilibrium to another, in which the head flies at proper and desired attitude and distance. Due to the differences in the thickness of discs and due to possible lack of a precisely plane configuration of the disc's surface, the head position in terms of distance, pitch and roll angles by,of and within the gimbal, cannot be established in relation to an assumed datum plane as established by the mounting structure, but only by the particular disc's surface itself. Therefore, in order to establish proper attitude and to maintain that proper attitude during operation, adjustment and final positioning of the head is carried out as follows:

Pressure is applied to chamber 15 so as to deflect diaphragm 14 gradually to such an extent that head 30 is deflected toward the disc. The deflecting pressure is balanced in each instant by the resilient reaction of spring 12. The pressure is varied until the lower surface 30 of the head just engages the disc surface in flat, coplanar surface to surface contact. Of course, the disc does not rotate for this procedure.

The particular pressure establishes the precise degree of protraction of the head 30. Particularly, the lower surface 31 of head 30 is coplanar with the disc's surface, whereby there is balance of forces on the head to retain the head in that position relative to the actual disc's surface. Any deviation from that balance can be based on and determined relative to that established position of balance as a zero reference. Moreover, a particular orientation of head 30 within the gimbal frame 21, as far as pitch and roll is concerned, is established as the head (1) rests on the disc and (2) is presumed freely pivotable about pitch and roll axes.

The precise pressure value needed to obtain engagement of head 30 on the disc is ascertained, so as to permit subsequently restoration of this position under operating conditions, simply by applying the same pressure to chamber 15. Alternatively, one can proceed as follows: A particular pressure is applied first to chamber 15, deflecting spring 12. Next, the entire structure, including, for example, the base 10 or the relative position of spring 12 as mounted to the base, can be shifted and position-adjusted so that head 30 just engages sets on the disc without interacting. Subsequently, base and spring etc. are tightened down.

In either case, the protraction of the head to a particular position in relation to the disc has been made a reversible process through pressure control in chamber 15 alone. As to maintaining the pitch and roll orientation of the head, one proceeds as follows:

Gimbal frame 21 is provided with a fork 33 having upwardly extending prongs. These prongs, in effect, extend to the left and right of carrier bar 24 but rather close thereto. The orientation of fork 33 relative to element 24 reflects the particular roll angle position of gimbal frame 21 which, in turn, is a measure of misalignment of the pitch axis as to parallelism with the surface of the disc. The prong spacing essentially defines (arbitrarily) the degree of such permissable misalignment.

Another fork 34, having a pair of prongs, extends from gimbal frame 21, and pin 35, as mounted to head 30, and extends between the prongs of fork 34. In essence, the actual spacing between these prongs and pin 35 defines the degree of misalignment of the roll axis as to parallelism with the disc's surface.

Also, due to irregularities in the dimensions of the disc, pin 35 is not necessarily symmetrically located between the prongs of fork 34; the same holds true as to bar 24 between the prongs of fork 33. It is essential that the distance between the several prongs from each other, considered in relation to the interposed pin or bar, is sufficient so that under reasonably expected operating conditions of disc surface tilt and axis misalignment etc., there is no metal-to-metal contact between pin or bar and the prongs of the respective fork.

Now, a certain amount of, for example, lquidous silicon rubber of the type traded under the designation RTV 109 is deposited in between the space defined by the prongs of fork 33 and element 24. Also, two drops of such silicon rubber are repsectively deposited between pin 35 and the two prongs of fork 34.

This silicon rubber has sufficiently high viscosity, i.e., it is thixotropic so that it will not drop. Thus, prongs and pin or bar are at this point "interconnected" by liquid but any tension is not applied to either part so connected. The drops respectively adapt in shape to the existing spacings as between the prongs of fork 34 and pin 35 and also between each of the prongs of fork 33 and bar 24. Due to the requirement that between each prong and pin or bar, there is some spacing, a certain amount of silicon rubber can be deposited in between, pin and bar on one hand, and the respective prongs on either side.

This silicon rubber is subseuqently cured. The suggested material (silicon rubber as defined) was found suitable for the simple reason that it is a so-called room temperature vulcanizer, i.e., the curing can be had at room temperature and in air. This means that the curing process is in effect nothing but a waiting period, taking approximately 24 hours or possibly longer which depends on particulars of the composition, until the silicon rubber has completely solidified. As a consequence, spacers 40 develop between prongs and pin and bar.

It is emphasized that throughout the curing process pressure is applied to chamber 15 and to diaphragm 14 to place the head 30 in contact with the disc. After the silicon rubber has been cured, there is no resilient interaction in that position as between the prongs of the forks 33 and 34 on one hand, and element 24 and pin 35 on the other hand.

As now pressure is taken away from the chamber 15, spring 12 retracts head 30 and head carrier 20, so that the head is no longer in contact with the disc. However, the previous position is remembered by the hardened silicon. Any deflection of the head about pitch or roll axes sets up reaction forces in the silicon tending to restore the orientation of the head to that position which, when and if protracted, establishes the desired attitude of the head relative to either axis. This restoration of orientation is carried out regardless of retracted or protracted position of the head as a whole. In the retracted position this tendency of restoration of the desired attitude is immaterial per se, but as soon as the particular pressure is again applied to chamber 15, the head is protracted, and if the disc is still at rest, the head will again engage the disc's surface, without setting up tension in either spacer 40. This is restoration of the first equilibrium position of the head.

It may now be assumed that disc D rotates at predetermined speed. As the head is caused to protract, its lower surface 31 will experience aerodynamic lifting forces set up by the boundary layer on the disc acting on the head and causing the head to "fly." The head is now in a second position of equilibrium, differing from, but having definite relation to the first one. This relation is given by the aerodynamic lifting force reducing the reaction of spring 12 required to balance the pressure in chamber 15. That reduction is equivalent to a slight head retraction by the spring.

Aerodynamic force as lifting head 30 actually causes the cantilever end of spring 12 to be tilted about an axis through the anchoring point of spring 12 in base 10. Thereupon, the plane of lower head surface 31 is not only lifted but also tilted. The lever arm of spring 12 is selected so that the tilting angle equals the small attitude angle for the flying head. Moreover, that tilting axis through the anchoring point of spring 12 is sufficiently parallel to the pitch axis of the head so that a roll angle error is not introduced.

It should be mentioned that the attitude of the head could be established somewhat differently, for example, by lifting the leading edge of surface 31 somewhat from the surface of the disc during the spacer establishing procedure but this was found not to be necessary. Essential is that the silicon rubber spacers 40 establish and maintain proper attitude of the head carrier as a whole and of the lower head surface in particular in relation to the disc.

The silicon rubber, as placed, has two specific functions. First of all, it serves as a spacer element to establish a "zero" position as to pitch and roll axis orientation relative to the disc. Therefor, elements 40, as spacers are provided to fix the desired position between relative stationary and pivotable components in the zero position, so as to orient the plane of head surface 31 for the flying attitude. Specifically, the silicon between the prongs of fork 33 and bar 24 serves as spacer to fix the angular position of gimbal frame 21 relative to spring 12 about the roll axis. The silicon spacers between the prongs of fork 34 and pin 35 establishes tha angular position of head 30 in frame 21 about the pitch axis.

As the silicon material is a solid, it provides, in effect, the function of spacers which by virtue of the initial process of applying has precisely the dimensions as needed, in order to establish proper attitude and roll of the head with regard to the specific disc with which the transducers in the head are cooperate. In other words, the dimensions of the spacers are established in situ exactly as needed and not on basis of assumed predetermined dimensions.

Secondly, the silicon material provides resiliently reacting elements which tend to restore the desired attitude of the head 30 by resilient interaction. This is so, because silicon rubber has elastic memory and always tends to restore its tension-free state. Thus, the silicon rubber combines the position restoring with the spacing function.

It should be emphasized that this embodiment is regarded as the best mode of practicing the invention as far as known at this time. This is particularly so, because it was found that spacing and restoring functions can be combined in one type of element for providing both functions. However, these two functions could be separated. For example, spring could be interposed between the prongs of fork 34 and pin 35 on the other hand. Each spring may be soldered, or for example, with one end to pin 35. Now, the spring is completely relaxed and a plurality of thin washers are interposed between the prongs 34 and the respective other ends of this spring. Then the washers are soldered to that other spring end. However, it was found that the above solution of combining spacer and restoring functions in one elastic element (or type of element) is preferred. Nevertheless, separation of spacing and restoring function is still within the scope of the present invention.

The invention is not limited to the embodiments described above but all changes and modifications thereof not constituting departures from the spirit and scope of the invention are intended to be included.

I claim:

1. In a transducing system, of the flying head type, wherein a transducer head cooperates with a hard surface storage carrier moving at a speed resulting in aerodynamic lift of the head by a boundary layer above the surface of the storage carrier, the combination comprising:

first means establishing a gimbal suspension for the head above the surface of the storage carrier, thereby establishing pitch and roll axes of the head as to its relative motion on the boundary layer of the storage carrier;

second means for mounting the gimbal suspension of the first means in relation to the surface of the carrier and including means (a) to obtain protraction and retraction of the head and of the gimbal system relative to the surface of the carrier further including means (b) to cause the means (a) to place the head on the surface in protracted position without force interaction between head and surface when the carrier is at rest, and establishing resilient reaction against aerodynamic lift of the head upon relative motion between the head and the carrier; and third means cooperating with the first and second means to obtain particular pitch and/or roll positions of the head relative to the actual surface of the carrier and including cured thixotropic liquid retaining the head in said positions and tending to restore the positions in case of angular deviation therefrom about pitch adn/or roll axes.

2. In a system as in claim 1, the first means including a gimbal frame, and first pivot means for pivotally supporting the head on a first axis, further including second pivot means for pivotally supporting the frame a support bar for pivoting on a second axis, the support bar suspended by the second means;

the third means including cured thixotropic liquid as a first resilient means maintaining the angular head position relative to the first axis in force-free relation in the particular position of the head relative to the carrier, the third means including cured thixotropic liquid as a second resilient means maintaining the angular head and frame position relative to the second axis in force-free relation in the particular position of head relative to the carrier, the first and second resilient means providing position restoring forces when the head is deflected from said angular positions.

3. In a system as in claim 1, the means (a) included in the second means comprising a pressure operated plunger to control protraction and retraction of the head, the second means including additionally cantilever spring means, deflected for setting up a reaction force when the plunger has position to protract the head.

4. The equipment for establishing a particular mounting position of a transducer head in relation to a hard surface storage carrier using a gimbal structure establishing pitch and roll axes, comprising:

first means for placing the transducer head in a particular position normal to the carrier, the head having a surface that obtains a particular position and orientation to the carrier when the head is placed in the particular position;

second means including cured thixotropic liquid for providing an interaction-force-free connection between the head and the gimbal structure in that position of the head, as to pitch and roll of the head surface in relation to the gimbal structure; and third means for removing the head from the particular normal position while retaining the connection as provided, the connection having characteristics of setting up restoration forces when there is an angular deflection of the head about the pitch and roll axes as established by the gimbal structure.

5. The equipment as in claim 4, the first means provided for causing the head to rest on the carrier without interacting forces normal to the engaging surfaces thereof.

6. The method of establishing a particular mounting position of a transducer head in relation to a hard surface storage carrier, using a gimbal structure establishing pitch and roll axes, comprising:

placing the transducer head in a particular position normal to the carrier, the head having a surface that obtains a particular position and orientation to the carrier surface, when the head is placed in the particular position; providing an interaction-force-free connection between the head and the gimbal structure in that position of the head as to pitch and roll of the head surface in relation to the gimbal structure; and removing the head from the particular normal position while retaining the connection as provided, the connection having characteristics of setting up restoration forces when there is an angular deflection of the head about the pitch and roll axes as established by the gimbal structure.

7. The method as in claim 6, the providing step including the providing of quantities of a thixotropic liquid as spacer between head and gimbal structure and in the gimbal structure in the particular pitch and roll positions of the head when placed and having the liquid, the liquid selected to convert into a resilient solid after curing.

* * * * *